2,974,049
FOUNDRY CORE BINDER

John W. Frieders, Evanston, Ill., assignor to International Minerals & Chemical Corporation, a corporation of New York No Drawing. Filed Dec. 30, 1957, Ser. No. 705,794

11 Claims. (Cl. 106—38.5)

This invention relates to foundry core binders and more particularly to a core binder having markedly superior hot properties.

Starches and starch derivatives have long been used as core binders in the foundry industry. "Cereal," for example, is a cereal grain flour (ordinarily corn flour), which is widely used as a component of core binders. These materials improve the baked strength of the cores, but have little effect upon their "hot properties"—i.e., their ability to withstand the erosion and stresses produced by molten metal, while yielding to avoid distorting or breaking the casting.

I have now developed a modified form of a starch fraction which combines the best features of the prior-art core binders; viz., acceptable green strength, good baked strength, and superior hot properties.

An object of my invention is to provide a superior foundry core binder.

Another object is to provide a core binder yielding improved hot properties.

Another object is to prepare an effective core binder from a starch fraction which, it now appears, has heretofore acted in a detrimental manner when included in core binders.

Other objects of the invention will be apparent from the present description and claims.

It is well known that starch comprises two distinctly different types of molecules, specifically the amylose or straight-chain fraction, and the amylopectin or branched-chain fraction. These fractions can be separated in a variety of ways, of which hot water fractionation of swollen starch granules is perhaps the simplest (Meyer et al., Helv. Chim. Acta, 23 (1940), 845). The most effective technique, however, appears to be to fractionate an aqueous dispersion of starch by addition of butanol or pentanol (Schoch, Cereal Chem., 18 (1941), 121; J. Am. Chem. Soc., 64 (1942), 2957). Either of these alcohols causes selective precipitation of the amylose constituents of starch, leaving the amylopectin in solution. Both of the fractions are obtained in gelatinized form, but can readily be dried.

In studying starch fractions as core binders, my associates recently found that the gelatinized amylose obtained as described above not only is ineffective as a core binder, but actually impairs the effectiveness of the amylopectin fraction. Moreover, the degree of impairment is far greater than a mere dilution effect, being over two times as great as the effect that might be predicted from simple dilution.

I have now found that the gelatinized amylose fraction, when subjected to modification in a manner analogous to the technique of Hans Neukom described in U.S. Patents 2,884,412 (April 28, 1959) and 2,865,762 (December 23, 1958), is converted into a form which functions in a superior manner as a core binder, having not only good green strength and baked strength, but also hot properties of outstanding merit.

In my modification of the Neukom method, gelatinized amylose is combined in an aqueous medium with an alkali-metal orthophosphate salt, then dried and heated at a temperature between about 125 and about 200° C., whereby the desired changes in the properties of the amylose are brought about. In one representative example, dried, gelatinized amylose is immersed in an aqueous solution of an alkali-metal orthophosphate, the liquid phase is removed, the impregnated amylose is dried to less than about 15% by weight of moisture, and the dried mixture of amylose and phosphate is heated for around 1 to 15 hours at a temperature preferably between about 150 and about 175° C., the length of the heating period varying inversely with the temperature. In another example, an aqueous dispersion of gelatinized amylose is commingled with an aqueous solution of an alkali-metal orthophosphate, the resulting mixture is dried (by spray drying, for example, or by evaporation and flaking on a drum dryer), to a moisture level below about 15% by weight, and the dried material is similarly heated at around 150 to 175° C. In a typical example, the impregnated amylose is baked at a temperature around 160° C. for about 5 hours.

Preferred phosphate salts are sodium, potassium, and lithium orthophosphate, alone or in suitable combinations to yield a pH in aqueous solution between about 4 and about 7, preferably around 6, measured at 25° C. at the concentration employed. For example, monosodium orthophosphate and disodium orthophosphate are combined in aqueous solution in such proportions as to produce a pH between about 6 and about 7. Or the desired salts may be formed in situ, for example, by dissolving trisodium orthophosphate or other basic phosphate salt in water and adjusting the pH of the solution to the desired level by adding orthophosphoric acid or an acidic orthophosphate salt. Alternatively, otrhophosphoric acid or an acidic phosphate salt in aqueous solution may be adjusted upward to the desired pH by adding an alkali-metal hydroxide or a basic alkali-metal orthophosphate salt.

For impregnating amylose, the phosphate solution may suitably be between about 1 and about 3 molar in phosphate and should be used in a quantity equivalent to at least about 1% of weight by phosphorus, preferably between about 3 and about 10%, based on the quantity of amylose to be treated. The quantity and concentration of solution should be chosen so that the dried amylose will form a slurry when commingled therewith. The quantity of amylose will generally be less than 1.5 times the weight of the water contained in the solution, and will preferably be less than the weight of the water. The slurry should be agitated or stirred for 5 to 10 minutes or more to permit the amylose particles to become soaked with the solution.

In treating an amylose dispersion, the concentration of the phosphate solution is of less importance, except of course that the quantity of phosphate should be sufficient to incorporate the desired proportion of phosphorus in the completed material, and excessive dilution is undesirable since it increases the cost of drying.

My new product may be termed an alkali-metal orthophosphate modification of gelatinized amylose. As ordinarily prepared, it is a finely divided or readily pulverized white solid, amorphous in structure, and readily dispersible in cold water.

My new product can be employed alone or in combination with any of the usual types of core binders, suitably in a proportion between about 0.1 and about 3% by weight of the core mixture, preferably between about 0.5 and about 1.5%, dry basis. The core mixture is conveniently prepared by commingling a sand of the desired sort with my modified amylose in the desired proportion, adding water to a total proportion of around 3 to 6% by weight, dry basis, and mixing. In a preferred technique, sand is mulled with water at a total water proportion between about 4 to about 5%, modified amylose is added, and mulling is continued for around 5 to 10 minutes. Cores are then prepared from the mixture in the conventional way and are baked according to conventional techniques at a temperature of about 300 to about 600° F. for a sufficient time to reach maximum tensile strength. In baking cores, the temperature and time required vary widely according to the size of the core, the surface-to-volume ratio, the water content, the type of sand, and the nature of the core binder. Laboratory cores are preferably baked at a temperature between about 350 and about 450° F., and maximum tensile strength is ordinarily reached in about 10 to about 100 minutes. For small cores containing my new binder, a baking period of around 10 to 30 minutes is generally sufficient. For commercial cores, the baking time may range up to 24 hours, and temperatures up to 600° F. are sometimes used to speed up the process.

My phosphate-modified amylose is especially useful as a core binder in combination with a phosphate-modified starch of the Neukom type, wherein dry, ungelatinized whole starch is steeped in aqueous phosphate solution, dried, and baked according to the technique described above. This particular combination of ingredients produces cores of markedly superior hot strength.

Another advantageous use of my phosphate-modified amylose is in combination with gelatinized amylopectin. In this combination, the amylopectin contributes baked strength, while the amylose contributes hot strength; and by appropriate adjustment of their relative proportions, the core binder can be tailored to produce virtually any desired combination of properties.

My invention will be more fully understood from the following operating examples. The test methods described therein are in conformity with standard practices as described in the "Foundry Sand Handbook," Sixth Edition (1952), published by the American Foundrymen's Society, Chicago. All measurements are given on a dry basis. In each case, the cores were prepared and tested in triplicate, and the reported results are the average of the three tests.

*Example 1*

A sodium phosphate-modified derivative of gelatinized amylose for use in accordance with my invention was prepared according to the following procedure. An aqueous phosphate solution was prepared having the following composition:

| | Lb. |
|---|---|
| Water | 4.10 |
| $Na_2HPO_4 \cdot 2H_2O$ | 1.06 |
| $NaH_2PO_4 \cdot H_2O$ | 0.44 |

To this solution were added 2.00 lb. of dried gelatinized amylose at 55° C. The mixture was stirred for 30 minutes and filtered, and the solids were dried at 50° C. for 30 hours. The dried product was baked in an oven at 160° C. for 11 hours. The product dispersed readily in cold water, and contained 6.46% Na and 5.24% P.

The dried product was tested at 1% concentration in a core prepared from No. 50 Ottawa sand. The dry amylose phosphate and sand were mixed for one minute, 5% water was added, and the wet mixture was blended for 6 minutes and formed into standard test cores. The cores were baked at 425° F. over a series of baking periods, cooled at room temperature 45 minutes, and tested on a Dietert Universal Sand Strength Machine. The results were as follows:

| Baking time: | Tensile strength at break, p.s.i. |
|---|---|
| 10 min. | 80 |
| 12.5 min. | 145 |
| 15 min. | 177 |
| 20 min. | 157 |

For comparison, the original gelatinized amylose was tested at 1.25% concentration in a series of cores which were otherwise identical in preparation. The test results were far inferior:

| Baking time: | Tensile strength at break, p.s.i. |
|---|---|
| 10 min. | Below 25 |
| 12.5 min. | Below 25 |
| 15 min. | 52 |
| 20 min. | 62 |

*Example 2*

The phosphate-modified amylose prepared in Example 1 was further tested according to the following procedure. No. 1 steel sand having an AFS grain fineness of 65 ("AGF 65") was mulled with 5% water for 1 minute; then 1% of the phosphate-modified amylose was added and the mulling was continued for 6 minutes. The completed core mixture contained 4.9% of water. Standard test cores prepared therefrom had a green strength of 1.15 p.s.i. When baked 20 minutes at 425° F., their tensile strength at break was 205 p.s.i.

The core mixture was then tested for "hot strength," measured in terms of the resistance to collapse of a 1⅛" dia. x 2" cylindrical test core under a given load at a given temperature. The test cores were baked 20 minutes at 425° F., then subjected to a 100-lb. load and placed quickly in an oven at a chosen higher temperature. At 800° F., the core withstood the load for 12 minutes; the load was then gradually increased, and the core collapsed at 150 lb. At 1000° F. and 100 lb., the core collapsed at an average time of 5.88 min. The cores were thus shown to have extraordinarily high hot strength.

*Example 3*

The following tests illustrate the use of the phosphate-modified amylose prepared in Example 1 in combination with a technical-grade sodium phosphate-modified corn starch, prepared from dry, ungelatinized corn starch according to the method of Neukom described hereinabove. The modified corn starch contained 4.04% phosphorus and produced a 5% aqueous dispersion having a viscosity of 6310 cp. at 25° C.

No. 1 steel sand, AGF 65, was mulled with 5% water for 1 minute. Then 1% of a mixture of equal parts by weight of the phosphate-modified amylose and the phosphate-modified corn starch was added, and mulling was continued for 6 minutes. The completed mixture retained 5.2% water. Standard test cores prepared therefrom had a green strength of 0.85 p.s.i. When baked at 425° F., their strength was as follows:

| Baking time: | Tensile strength at break, p.s.i. |
|---|---|
| 15 min | 245 |
| 20 min | 230 |

Hot-strength test cores, baked 20 min. at 425° F., had the following properties:

| Oven temp.: | Time for collapse, min. |
|---|---|
| 800° F | 7.90 |
| 1000° F | 5.55 |

The foregoing illustrations of my invention, employing various manipulative techniques, operating conditions, and other incidental details, are intended only to clarify the nature of the invention, and not to limit the scope thereof. Numerous modifications and equivalents of the invention will be apparent from the foregoing description to those skilled in the art.

In accordance with the foregoing description, I claim as my invention:

1. An alkali-metal orthophosphate derivative of amylose, obtained by impregnating gelatinized amylose with at least about 1% by weight of an alkali-metal orthophosphate in the form of an aqueous solution having a pH between about 4 and about 7, and heating the impregnated amylose at a moisture content less than about 15% by weight and at a temperature between about 125 and about 200° C. for a period of about 1 to about 15 hours, the length of the heating period varying inversely with the temperature.

2. A foundry core containing between about 0.1 and about 3% by weight of the amylose derivative defined in claim 1.

3. In a foundry core, an improved binder having superior hot properties which comprises an alkali-metal orthophosphate derivative of amylose, prepared by impregnating gelatinized amylose with at least about 1% by weight of an alkali-metal orthophosphate in the form of an aqueous solution having a pH between about 4 and about 7 and heating the impregnated amylose at a moisture content below about 15% by weight and at a temperature between about 150 and about 175° C. for a period of about 1 to about 15 hours, the length of the heating period varying inversely with the temperature.

4. A foundry core containing between about 0.5 and about 1.5% by weight of the amylose derivative defined in claim 3.

5. In a foundry core, an improved binder having superior hot properties which comprises an alkali-metal orthophosphate derivative of amylose, prepared by commingling gelatinized amylose with an alkali-metal orthophosphate in an aqueous medium having a pH between about 4 and about 7, the proportion of said alkali-metal orthophosphate to said amylose being at least about 1% by weight, drying the resulting mixture to a moisture content less than about 15% by weight, and baking the dried mixture at a temperature between about 150 and about 175° C. for a period of about 1 to about 15 hours, the length of the baking period varying inversely with the temperature.

6. In a foundry core, an improved binder having superior hot properties which comprises an alkali-metal orthophosphate derivative of amylose prepared by immersing dried, gelatinized amylose in an aqueous solution of an alkali-metal orthophosphate having a pH between about 4 and about 7, removing the liquid phase from the amylose, drying the amylose to a moisture content less than about 15% by weight and to an alkali-metal orthophosphate content between about 3 and about 10% by weight, dry basis, and baking the dried amylose at a temperature between about 150 and about 175° C. for a period of about 1 to about 15 hours, the length of the baking period varying inversely with the temperature.

7. In a foundry core, an improved binder having superior hot properties which comprises a sodium orthophosphate derivative of amylose prepared by immersing dried, gelatinized amylose in an aqueous solution of sodium orthophosphate having a pH around 6, removing the liquid phase from the amylose, drying the amylose to a moisture content less than about 15% by weight and to a sodium orthophosphate content between about 3 and about 10% by weight, dry basis, and baking the dried amylose at a temperature around 160° C. for a period of about 5 hours.

8. In a foundry core, an improved binder having superior hot properties which comprises an alkali-metal orthophosphate derivative of amylose, prepared by commingling an aqueous dispersion of gelatinized amylose with an aqueous solution of an alkali-metal orthophosphate having a pH between about 4 and about 7, drying the resulting mixture to a moisture content less than about 15% by weight and to an alkali-metal orthophosphate content between about 3 and about 10% by weight, dry basis, and baking the dried material at a temperature between about 150 and about 175° C. for a period of about 1 to about 15 hours, the length of the baking period varying inversely with the temperature.

9. A combination binder for foundry cores, comprising alkali-metal phosphate-modified derivatives of gelatinized amylose and ungelatinized whole starch, said derivatives having been prepared by impregnating gelatinized amylose and ungelatinized whole starch with at least about 1% by weight of an alkali-metal orthophosphate in the form of an aqueous solution having a pH between about 4 and about 7, drying the impregnated materials to less than about 15% by weight of water, and baking the dried materials at a temperature between about 125 and about 200° C. for a period of about 1 to about 15 hours, the length of the baking period varying inversely with the temperature.

10. A combination binder for foundry cores, comprising gelatinized amylopectin and an alkali-metal orthophosphate derivative of amylose, said amylose derivative having been prepared by commingling gelatinized amylose with at least about 1% by weight of an alkali-metal orthophosphate in an aqueous medium having a pH between about 4 and about 7, drying the resulting mixture to a moisture content less than about 15% by weight, and baking the dried mixture at a temperature between about 125 and about 200° C. for a period of about 1 to about 15 hours, the length of the baking period varying inversely with the temperature.

11. In a method for the production of a foundry core from a mixture of sand, water, and binder, the improvement which comprises incorporating into said binder an alkali-metal orthophosphate derivative of amylose as defined in claim 1 in an amount sufficient to improve the hot strength of the resulting core.

References Cited in the file of this patent

UNITED STATES PATENTS

| | | |
|---|---|---|
| 1,531,871 | Nagel | Mar. 31, 1925 |
| 1,974,915 | Giesecke | Sept. 25, 1934 |
| 2,779,693 | Pacsu et al. | Jan. 29, 1957 |
| 2,806,026 | Evans | Sept. 10, 1957 |
| 2,884,412 | Neukom | Apr. 28, 1959 |

FOREIGN PATENTS

| | | |
|---|---|---|
| 543,202 | Great Britain | Feb. 13, 1942 |

OTHER REFERENCES

Foundry—February 1950, page 177.